Patented July 20, 1954

2,684,322

UNITED STATES PATENT OFFICE 2,684,322

ION EXCHANGE PURIFICATION OF VITAMIN $B_{12}$

George C. Colovos, Kalamazoo, Mich., assignor to The Upjohn Company, Kalamazoo, Mich., a corporation of Michigan No Drawing. Application February 27, 1950, Serial No. 146,621

3 Claims. (Cl. 167—81)

This invention relates to vitamin $B_{12}$ and is directed particularly to processes in which solutions containing vitamin $B_{12}$ are subjected to treatment with a plurality of different ion-exchange resins or organolytes.

The presence of an anti-pernicious anemia factor or factors in various animal organs, particularly in liver, is well established. So-called "liver concentrates," which contain such factors, have wide usage in the treatment of pernicious (Addisonian) and macrocytic anemias of the pernicious anemia type with a megaloblastic bone marrow. The anti-pernicious anemia fraction of liver has been highly concentrated [Biochem. Journal (Proceedings) 1946, vol. 40, page iv; Nature, 1948, vol. 161, page 638; and Science, 1948, vol. 107, page 396]. Because the anti-pernicious anemia factor appears to be but a single chemical entity it is herein designated, without regard to its source, as vitamin $B_{12}$; this entity may consist of other active related substances. In conformity with present practice, irrespective of whether this fraction that is known to be effective in combating pernicious anemia consists of one or more chemical entities, the term vitamin $B_{12}$ as used hereinafter designates those substances or fractions which are clinically effective in the treatment of pernicious anemia or Addisonian pernicious anemia.

In addition to its presence in liver, vitamin $B_{12}$ is associated with the mycelia of Streptomyces griseus and Streptomyces fradiae when cultured on certain artificial media and is also known to be present in appreciable amounts elsewhere, for example, in such packing-house wastes as hog, cattle and chicken faeces, and in the stomach contents of slaughtered animals. The anti-pernicious anemia factors present in these packing-house wastes are known and referred to as "animal protein factors." The processes of the present invention are applicable to the concentration of vitamin $B_{12}$-containing fractions from all such sources.

Processes by which vitamin $B_{12}$ may be concentrated have been described heretofore in the art with particular respect to liver as the source material. The preparation of an aqueous solution of the anti-pernicious anemia factor or vitamin $B_{12}$ is a step common to many of the known methods for the concentration of the vitamin $B_{12}$ activity. Whether the solution in water is obtained by extraction of whole liver to give a crude starting preparation, or whether it is obtained by extraction with organic solvents and recovered from the solvents by extraction with water or by precipitation at various stages of a purification procedure involving other steps, is of no consequence, it being necessary only that the vitamin $B_{12}$ be in aqueous solution. Such an aqueous solution, or the paste or the dry solids obtained by the partial or complete removal of water therefrom, serves as the starting point for conventional procedures for the preparation of liver or vitamin $B_{12}$ concentrates, as described for example, by Laland and Klem, Acta. Med. Scand. 1936, vol. 88, page 620, and United States Patents 2,134,256, 2,125,844, 2,324,848 and 2,369,465. Although these and other procedures have produced useful liver concentrates, products containing vitamin $B_{12}$ at a purity of more than about 0.2 microgram (0.2 gamma or 0.0002 milligram) of vitamin $B_{12}$ activity per milligram of total solids, such products have not attained widespread use in anemia therapy. Vitamin $B_{12}$ has been obtained in much greater purity than this, but only after treatment by long and complicated purification procedures.

Simpler methods by which the content of vitamin $B_{12}$ of such preparations can be increased and the cost materially reduced are desirable. It is also desirable to have available a procedure by which vitamin $B_{12}$ present in a dilute aqueous solution can be easily extracted and obtained in the form of a concentrated solution having a greatly reduced volume. Some of the known procedures produce a more concentrated product when applied to crude materials but are of little value when applied to the concentration of more highly purified vitamin $B_{12}$-containing materials. A procedure which is effective when applied to concentration or purification of more highly purified vitamin $B_{12}$ preparations would also be useful. In order heretofore to produce highly purified vitamin $B_{12}$ preparations, it has been necessary to subject the crude preparation that has been highly concentrated to further action by mixed microorganisms as a means of removing impurities which hinder further purification, for example, as described in J. Biochem. Soc. (Proceedings) 1946, vol. 40, page iv. A procedure for obtaining a vitamin $B_{12}$ concentrate which can be converted readily to crystalline vitamin $B_{12}$ and which will avoid such treatments with microorganisms is also desirable.

Vitamin $B_{12}$ has a characteristic color which can be used for spectrophotometric identification and as a basis for rather accurate quantitative colorimetric and spectrophotometric assays of the substance. However, because in the crude form it is normally associated with colored organic impurities, the true color and spectrum of vitamin $B_{12}$ is masked by such contaminants. It is desirable to have a simple method by which the purity of vitamin $B_{12}$ can be increased. It would also be advantageous to have available a method whereby the colored impurities normally associated with crude vitamin $B_{12}$ preparations are removed without destruction or removal of vitamin $B_{12}$.

In accordance with the processes of this invention, such purification is readily achieved by successive treatment of aqueous vitamin $B_{12}$-containing solutions with two ion-exchange resins of different types. The process of the invention is applicable particularly to the treatment of dilute solutions of crude vitamin $B_{12}$ but may be adapted to the treatment of concentrated aqueous solutions and to crude preparations containing great quantities of solid impurities. When purified preparations of vitamin $B_{12}$ are subjected to treatment in accordance with the process of the invention, a portion of the vitamin $B_{12}$ is adsorbed by the resin and does not appear in the effluent solution, which is contrary to the behavior of crude preparations. The vitamin $B_{12}$-containing solutions which are preferably treated in accordance with the process of this invention are those containing at least 2.5 milligrams and preferably 40 to 120 milligrams of solids per milliliter of solution.

The processes of the invention consist essentially in contacting an aqueous solution containing vitamin $B_{12}$, first with a cation-exchange resin of the type specified hereinafter, and thereafter subjecting the solution to further treatment with an anion-exchange resin of another type which is referred to hereinafter. The order of treatment is critical since purification is not achieved if the treatment is reversed. The colored organic impurities are removed largely by the treatment with the anion-exchange organolyte but peculiarly such removal cannot be effected as advantageously unless the solution has been subjected to treatment preliminarily with the cation-exchange resin.

The aqueous solution of vitamin $B_{12}$ that has been treated in accordance with the process of this invention can be used directly for the preparation of salable products. It usually has a pink to red color and is especially adapted for use as a starting material for the production of crystalline vitamin $B_{12}$.

Heretofore ion-exchange resins have been used in the production of antibiotics and vitamins but in certain of such processes the resin functioned as an adsorbent and not primarily as an ion-exchange substance. Furthermore, such treatments were effected normally with only one resin. Pfiffner et al., for example, used the anion-exchange resin Amberlite IR-4 for adsorption of a substance possessing vitamin activity from hog liver extracts (U. S. Patent 2,407,096). Streptomycin has also been treated with "Permutite" (Waksman, U. S. Patent 2,443,485, and Le Page and Campbell, J. Biol. Chem., 1946, vol. 162, pages 163 to 172) and anion-exchange resins have been used to remove hydrochloric acid from eluates obtained by washing, with a mixture of methyl alcohol and hydrochloric acid, charcoal upon which streptomycin was adsorbed. Anion-exchange resins have also been used to convert the sulfate salt of streptomycin to the chloride. Cation-exchange resins have been used to convert the calcium salt of penicillin to the sodium and potassium salts.

Although the action of the plurality of ion-exchange resins in the process of the present invention is not clearly understood, they apparently act as adsorbents for certain organic substances and ion-exchange is only incidentally, if at all, involved. The vitamin $B_{12}$ apparently is not adsorbed nor does it itself appear to undergo any ion-interchange.

Cation-exchange or base-exchange resins whose use is contemplated in the process of the present invention include tannin-formaldehyde and phenol-formaldehyde resins and particularly those which contain combined sulfonic and methylene sulfonic acid groups, that is, resins made by condensation of a phenolic body with formaldehyde and sodium sulfite (see, for example, Holmes, U. S. Patent 2,191,853) and condensation of phenol sulfonic acids with formaldehyde. Such resins are sold under such tradenames as Dowex (Dow Chemical Co.), Duolite (Chemical Process Co.), Ionac-C (American Cyanamid Co.) and Zeo-Rex (Permutit Co.). Particularly useful cation-exchange resins are Ionac C-240 and Ionac C-200. Other suitable cation-exchange resins are those derived from condensation of formaldehyde with 4,4'-dihydroxydiphenyl-sulfone and an alkaline sulfiting agent (Harold M. Day, Patent No. 2,497,054) and Dowex 50, which is structurally a cross-linked aromatic hydrocarbon chain containing nuclear sulfonic acid groups as the sole cation-active groups (D'Alelio, U. S. Patent 2,366,007), such as may be formed by the sulfonation of a cross-linked polystyrene obtained by condensation of styrene and para-divinylbenzene.

Anion-exchange or acid-adsorbent resins whose use is contemplated in the process of the present invention include those which involve the condensation of an aromatic amine with formaldehyde, for example, condensation products of aniline or meta-phenylene diamine and formaldehyde (see, for example, Adams and Holmes, U. S. Patent 2,151,883), the condensation of phenol with ethylene diamine and formaldehyde, and condensation products of melamine having free tertiary amino and quaternary ammonium groups. Such resins are sold under such tradenames as Amberlite (Resinous Products Division of Rohm and Haas Co.), Ionac-A (American Cyanamid Co.) and the like. A particularly useful anion-exchange resin is Ionac-A–300, which is a melamine condensation product containing free tertiary amino and quaternary ammonium groups. Other suitable anion-exchange resins are Amberlite IRA–400.

The choice of the particular cation-exchange and anion-exchange resins will be determined to a substantial degree upon the type of vitamin $B_{12}$-containing solution that is to be treated, upon the character of the particular resins, that is, whether they are likely to "throw" or impart color to the treated liquid, their capacity, or activity, and their stability during treatment and ease of regeneration. With respect to these characteristics and the use of ion-exchange resins generally, reference is directed to the article by Robert J. Myers, John W. Eastes and Frederick J. Myers in Industrial and Engineering Chemistry, 1941, vol. 33, page 697.

It is of importance, for the utilization of the full capacity of the resins and for most economical operation, that the resins before use be activated by exhaustion with acid or alkali and subsequent regeneration. After use, the cation-exchange resins can be regenerated with acid in conventional manner without difficulty. However, the colored impurities which are removed by the anion-exchange resin in the process of this invention are extremely difficult to remove by conventional regeneration treatment with alkali. It has been found that these tightly held impurities are best removed by contacting the spent anion-exchange resin with an aqueous mineral acid, preferably hydrochloric acid, which removes a brown pigment. The anion-exchange resin can thereafter be regenerated readily with alkali in conventional manner.

An example of a preferred method of practicing the present invention, which is to be understood to be illustrative and not restrictive, is the following:

Sixteen liters of an aqueous solution containing 2.74 grams of vitamin $B_{12}$ having a purity of 0.092 microgram (0.092 gamma or 0.000092 milligram) per milligram of solids, obtained by cultivation of Streptomyces griseus on a suitable culture medium, as described in the copending application of Curtis E. Meyer and William H. De Vries, Serial No. 78,458, filed February 25, 1949, now Patent No. 2,595,159, was passed through a column 14 inches in diameter containing 3.6 cubic feet of cation-exchange resin Ionac C-240, a sulfonated styrene, at the rate of 5 liters per minute. The effluent solution was then passed through a second column 13 inches in diameter containing 2.75 cubic feet of anion-exchange resin Ionac A-300, a melamine condensation product having tertiary amine and quaternary ammonium groups, at the rate of 5 liters per minute. Distilled water was used to wash and force the vitamin $B_{12}$-containing solution through each column.

The effluent solution that had been treated in both columns had a volume of 19 liters and contained vitamin $B_{12}$ having a purity of 3.4 micrograms per milligram of solids. The pH of the solution was adjusted to 5.5 by the addition of 20 milliliters of concentrated hydrochloric acid. It was then filtered and dried by freezing in vacuum. There was thus obtained 747 grams of a light pink-colored solid containing 2.8 grams of vitamin $B_{12}$, which is substantially the same quantity as was treated, the slight difference being within the limit of error of the assay method.

Another solution containing vitamin $B_{12}$ at a purity of 1.46 micrograms per milligram of solids gave, upon treatment in substantially the same manner, a pink solution in which the vitamin $B_{12}$ corresponded to a purity of 13.0 micrograms per milligram.

In a similar manner, the use of a phenol-formaldehyde sulfonic acid cation-exchange resin designated Ionac C-200, gave comparable results but its capacity was somewhat less than that of Ionac C-240.

Although the foregoing description comprises preferred embodiments of the invention, it is to be understood that the invention is not limited thereto, and that variations and modifications may be made therein in conventional manner in accordance with the principles disclosed without departing substantially from the invention, which is to be limited solely by the scope of the appended claims.

I claim:
1. A process for the partial separation of associated impurities from vitamin $B_{12}$-active material by adsorption of impurities on an ion exchange resin which comprises intimately contacting an aqueous solution containing vitamin $B_{12}$ and normally associated impurities with a cation-exchange resin consisting of a resinous condensation product having sulfonic acid cation-binding groups, separating the solution from the resin, thereafter intimately contacting the separated solution with an anion-exchange resin having a basic nitrogen atom as the anion-binding group, separating the solution from the resin and recovering the decolorized and purified vitamin $B_{12}$-containing solid material from the solution.

2. A process for the purification of vitamin $B_{12}$ containing dark-colored congeneric impurities by adsorption of impurities on an ion exchange resin which comprises subjecting a dilute aqueous solution of the vitamin $B_{12}$ to successive contact with first a cation-exchange and then an anion-exchange resin, the cation-exchange resin being one of the group consisting of phenol-formaldehyde-sulfonic acids and sulfonated styrenes and the anion-exchange resin being a melamine condensation product, and subsequently recovering the purified vitamin $B_{12}$ from the resulting solution.

3. A process for the purification and concentration of vitamin $B_{12}$ by adsorption of impurities on an ion exchange resin which comprises subjecting an impure aqueous solution of the vitamin $B_{12}$ to contact with first a cation exchange resin followed directly by contact with an anion exchange resin, and subsequently recovering the purified vitamin $B_{12}$-containing solid material from the resulting solution.

References Cited in the file of this patent

UNITED STATES PATENTS

| Number | Name | Date |
|---|---|---|
| 2,388,194 | Vallez | Oct. 30, 1945 |
| 2,407,096 | Pfiffner | Sept. 3, 1946 |
| 2,443,485 | Waksman | June 15, 1948 |
| 2,563,794 | Rickes | Aug. 7, 1951 |
| 2,582,589 | Fricke | Jan. 15, 1952 |

FOREIGN PATENTS

| Number | Country | Date |
|---|---|---|
| 450,309 | Great Britain | Feb. 27, 1936 |

OTHER REFERENCES

Nachod: Ion Exchange (1949), page 382.
Science, vol. 101, April 1945, page 340.
Amber-hi-Lites, No. 3, August 1949, first page.
Emery: Biochemical Journal, vol. 46, May 1950, pp. 572 to 574.
Kunin: Ion Exchange Resins (1950), pp. 134, 187.